(12) United States Patent
Pfaffelhuber et al.

(10) Patent No.: US 10,493,726 B2
(45) Date of Patent: Dec. 3, 2019

(54) FLAT MOTOR VEHICLE COMPOSITE STRUCTURE COMPONENT HAVING A METAL SHEET COMPONENT AND A FLAT INHERENTLY RIGID REINFORCEMENT COMPONENT OF POROUS PLASTIC CONNECTED TO SAME

(71) Applicant: Röchling Automotive SE & Co. KG, Mannheim (DE)

(72) Inventors: Klaus Pfaffelhuber, Augsburg (DE); Frank Uhl, Flörsheim-Dalsheim (DE); Richard Koehnsen, Maulbronn (DE); Markus Sattel, Mühlacker (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 221 days.

(21) Appl. No.: 15/596,608

(22) Filed: May 16, 2017

(65) Prior Publication Data
US 2017/0368802 A1 Dec. 28, 2017

(30) Foreign Application Priority Data

Jun. 23, 2016 (DE) .................. 10 2016 211 314

(51) Int. Cl.
*B32B 15/14* (2006.01)
*B32B 3/26* (2006.01)
(Continued)

(52) U.S. Cl.
CPC .............. *B32B 15/14* (2013.01); *B32B 3/263* (2013.01); *B32B 3/266* (2013.01); *B32B 3/28* (2013.01);
(Continued)

(58) Field of Classification Search
CPC . B32B 15/14; B32B 2250/42; B32B 2471/00; B32B 2605/00; B32B 3/26;
(Continued)

(56) References Cited

U.S. PATENT DOCUMENTS

2003/0124940 A1 7/2003 Michael
2009/0317643 A1* 12/2009 Hsu .................. B29C 45/1418
428/457
(Continued)

FOREIGN PATENT DOCUMENTS

DE 102005054967 A1 5/2007

OTHER PUBLICATIONS

Espacenet Bibliographic data: DE102005054967 (A1), Published May 24, 2007, 1pg.
(Continued)

*Primary Examiner* — Camie S Thompson
(74) *Attorney, Agent, or Firm* — Rankin, Hill & Clark LLP

(57) ABSTRACT

A flat motor vehicle composite structure component, comprising a metal sheet component having a shaped metal sheet and to which at least one flat, inherently rigid reinforcement component of porous plastic is connected on at least one side of the metal sheet, the surface of the reinforcement component is adhesively connected to a side of the metal sheet component which, in the fully installed state, is intended to face a motor vehicle functional space.

21 Claims, 2 Drawing Sheets

(51) Int. Cl.
*B32B 3/28* (2006.01)
*B32B 5/02* (2006.01)
*B32B 7/12* (2006.01)
*B32B 15/08* (2006.01)
*B60R 13/08* (2006.01)
*B62D 25/02* (2006.01)
*B62D 29/04* (2006.01)

(52) U.S. Cl.
CPC ............... *B32B 5/022* (2013.01); *B32B 7/12* (2013.01); *B32B 15/08* (2013.01); *B60R 13/0815* (2013.01); *B62D 25/025* (2013.01); *B62D 29/04* (2013.01); *B32B 2255/02* (2013.01); *B32B 2255/06* (2013.01); *B32B 2262/02* (2013.01); *B32B 2307/102* (2013.01); *B32B 2307/718* (2013.01); *B32B 2471/02* (2013.01); *B32B 2605/08* (2013.01)

(58) Field of Classification Search
CPC .......... B32B 3/263; B32B 3/266; B32B 3/28; B32B 15/08; B32B 2255/02; B32B 2255/06; B32B 2262/02; B32B 2307/102; B32B 2307/718; Y10T 156/1002; Y10T 428/24331; Y10T 428/24496; Y10T 428/24917; Y10T 428/249981; B62D 25/025; B62D 25/20; B62D 25/14; B62D 25/001; B62D 25/005; B62D 29/005; B62D 29/04; B62D 29/043; B60R 13/0815; B29C 43/00; B29C 43/006; B29C 43/183; B23K 2101/006; B23K 2103/172

USPC ............ 428/138, 158, 209, 316.6, 198, 339, 428/411.1, 457, 621; 156/196; 442/391

See application file for complete search history.

(56) References Cited

U.S. PATENT DOCUMENTS

2010/0196736 A1    8/2010  Boger et al.
2014/0302279 A1*  10/2014  Pfaffelhuber ............. B32B 3/26
                                                              428/138

OTHER PUBLICATIONS

German Search Report for corresponding DE 10 2016 211 314.3 dated Jan. 20, 2017, 9 pgs.

* cited by examiner

FLAT MOTOR VEHICLE COMPOSITE STRUCTURE COMPONENT HAVING A METAL SHEET COMPONENT AND A FLAT INHERENTLY RIGID REINFORCEMENT COMPONENT OF POROUS PLASTIC CONNECTED TO SAME

The present invention relates to a flat motor vehicle composite structure component, comprising a metal sheet component having a shaped metal sheet and at least one flat, inherently rigid reinforcement component of porous plastic connected on at least one side of the metal sheet to said metal sheet component.

BACKGROUND OF THE INVENTION

It is known from the prior art, for example, from US 2003/0124940 A1, to line the outside of vehicle underbodies made of metal with an equally flat LWRT component in order, on the one hand, to protect the vehicle underbody from mechanical influences, such as stone impact, splashing water and the like and, on the other hand, to arrange an acoustically effective sound-absorbing component in the underbody of the vehicle, which dampens the sound emission emanating from the vehicle.

However, underbody linings of this type are connected to the vehicle underbody only at selected points, usually by mechanical means, in order to mount the underbody lining on the motor vehicle underbody. The underbody lining in such case does not contribute to the rigidity of the motor vehicle underbody as a metal sheet component due to the connection to the motor vehicle underbody only at selected points.

It is also known to line the inside of flat engine compartment covers with a sound-absorbing flat material in order to reduce the sound emission of the vehicle from the engine compartment. Even the known sound-absorbing lining of an engine compartment cover does not appreciably contribute to the overall rigidity of the engine compartment cover.

SUMMARY OF THE INVENTION

It is an object of the invention to design a flat motor vehicle structural component as a composite structure component having a higher rigidity with the same weight or having the same rigidity with less weight, wherein the composite structure component thus obtained should exhibit sound-absorbing properties.

This object and others are achieved according to the invention by a flat motor vehicle composite structure component of the aforementioned kind, in which the surface of the reinforcement component is adhesively connected to a side of the metal sheet component which, in the fully installed state, is intended to face a motor vehicle functional space.

Because of the adhesive connection of the surface of the inherently rigid reinforcement component to the metal sheet of the metal sheet component, the rigidity of the reinforcement component may be utilized to increase the rigidity of the entire motor vehicle composite structure component.

A bending rigidity about a bending axis situated in the plane of the metal sheet or extending tangentially to a curved surface of the metal sheet, in particular, is contemplated in this case.

Due to the adhesive connection of the surface of the reinforcement component to the metal sheet component, it is possible for forces between the metal sheet component and the reinforcement component to be transmitted at any point on the structural component. The thickness of the motor vehicle composite structure component made of the metal sheet component and reinforcement component connected to it is understandably greater than the thickness of the sheet component in and of itself. Since the bending rigidity of a component about a bending axis orthogonal to the thickness direction is proportional to the third power of the thickness dimension given the considerable geometrical moment of inertia in this case, it is possible to increase the bending stiffness as a result of an increase of thickness due to the mounting of the reinforcement component on the metal sheet component.

By using a porous plastic at least in sections in the reinforcement component, the latter is acoustically active and is able to absorb sound. The reinforcement component is arranged according to the invention on the side of the metal sheet component that faces a motor vehicle functional space, so that, on the one hand, any visible outer surfaces on the motor vehicle formed by the metal sheet component are not adversely affected in their visual appearance by the reinforcement component and, on the other hand, sound from sound sources in the relevant motor vehicle functional space may be absorbed. As a result, it is possible with the motor vehicle composite structure component thus formed to increase not only the rigidity of the metal sheet component originally present by itself, but at the same time also the sound emission-reducing effect of the metal sheet component. Thus, depending on the field of application, it is possible to eliminate additional sound emission-reducing measures in the motor vehicle composite structure component, which may result in an additional weight reduction of the motor vehicle, for example, because heavy sound-deadening material necessary in conventional metal sheet components without a reinforcement component need no longer be installed.

The flat motor vehicle composite structure component according to the invention therefore generally replaces a hitherto sole rigidity-determining metal sheet component and with this potentially replaces additional sound emission-reducing add-ons with simultaneously improved rigidity.

A motor vehicle functional space is any space enclosed by the motor vehicle, which serves to operate the motor vehicle. Possible motor vehicle functional spaces are, for example, an engine compartment, a luggage compartment, a passenger compartment and the like.

"Flat" within the meaning of the present application is intended to mean a component, which extends in a surface and its surface extension has significantly greater dimensions, for example, more than tenfold, than in its thickness direction orthogonal to the surface extension. The surface of the surface extension in this case is generally not planar, so that the thickness direction, as viewed in a spatially fixed coordinate system, may be variously oriented at different locations.

In principle, the reinforcement component may include porous plastic in the form of foam, for example, in the form of foamed polyurethane. The foam may be open-celled or closed-celled. For better acoustic effectiveness for the sound absorption, however, open-celled foam plastic is preferred.

Thermoplastically bonded fiber material is preferred as porous plastic of the reinforcement component, however, due to higher maximally achievable inherent rigidity given the same component thickness and due to inherent rigidity, which is advantageously adjustable within certain limits. The fiber material in the form of a fiber web is particularly preferred, having stochastically distributed oriented fibers thermoplastically bonded in order to preclude or reduce directional anisotropies in the reinforcement component. Such thermoplastically bonded porous fiber materials are also known among experts as "LWRT" (LWRT="Low Weight Reinforced Thermoplast") due to their comparatively low thickness.

The reinforcement component may have multiple layers of thermoplastically bonded fiber material, wherein the layers may differ with respect to mass percentages of fibers on the one hand and thermoplastic binder on the other hand. Fibers of the fiber material may include, in particular, glass fibers, mineral fibers, plastic fibers made of plastic having a melting point of over 160° C., natural fibers and the like. Glass fibers are preferably used. The use of carbon fibers is also conceivable.

To increase the component strength of the reinforcement component and, therefore, also of the composite structure component as a whole, it is advantageous if the reinforcement component has at least one metal foil layer. The metal foil preferably has a thickness in the range of 0.03 mm to 1.3 mm. The metal foil layer is a fiber-free metal layer, in contrast to the preferably fibrous material of the porous plastic.

The metal foil layer may, in principle, be provided on the side situated outside on the reinforcement component directed toward the metal sheet component. The reinforcement component is preferably connected, however, to the metal sheet component under immediate arrangement of a plastic layer of the reinforcement component, so that the plastic layer may ensure a mechanical damping between the metal foil layer and the metal sheet component. The plastic layer is particularly preferably a porous plastic layer for reducing the weight and for achieving a sound-absorbing effect. The interposed plastic layer is designed with a constant thickness, so that the metal foil layer extends in parallel to the mounting surface of the metal sheet component, with which the reinforcement component is adhesively connected.

Furthermore, a solid metal foil layer may also serve as a barrier layer, which represents an impenetrable barrier for a passage of liquid and gas in the thickness direction of the reinforcement component.

In addition or alternatively, one or multiple plastic foils may be arranged as fluid barriers and/or gas barriers in the reinforcement component. These plastic foils preferably separate layers of porous plastic from one another and are separated by layers of porous plastic. The at least one plastic layer thus arranged extends preferably also in parallel to the cited mounting surface and is formed from a plastic, which is compatible with the porous plastic, in particular with the thermoplastic binder used therein, in order to facilitate a connection of the porous plastic with the plastic foil.

The reinforcement component may also have a plurality of metal foil layers in order to further increase the inherent rigidity, in particular tensile rigidity, bending rigidity or/and torsional rigidity of the reinforcement component. The aforesaid with respect to the plurality of plastic layers applies accordingly to the plurality of metal foil layers: the former are preferably each separated from one another by at least one porous plastic layer and each separate two porous plastic layers from one another.

Moreover, the metal foil layers, with the possible exception of special areas, which are designed, for example, for attaching additional components or for performing particular tasks, extend preferably in parallel to one another and to the mounting surface of the metal sheet component.

The metal foils are preferably designed the same so that they preferably have the same thickness and the same material. The aforesaid with respect to at least one metal foil layer regarding thickness and material structure applies accordingly to each individual metal foil layer.

Solid metal foil layers may, in fact, increase the strength of the reinforcement component overall and, therefore, of the composite structure component and, in addition, may form a very good liquid barrier and vapor barrier. However, they also act as sound reflectors, which diminishes the sound-absorbing effect of a porous plastic layer which, as viewed from a sound source, is situated behind a metal foil layer.

In order to essentially continue to achieve the increase in strength, but to also be able to utilize porous plastic layers located beyond a metal foil for sound absorption, it is preferred if at least one metal foil layer is perforated. If multiple metal foil layers are present, the metal foil layer located most distant from the mounting surface is preferably perforated, since this layer is located closest to the motor vehicle functional space, in which the occurrence of sound sources is expected during operation of the vehicle. It should not be ruled out that more than one metal foil layer is perforated. To ensure the strength of the reinforcement component, it is possible for at least one metal foil layer to be solid, i.e., unperforated. If multiple metal foil layers are present, the metal foil layer located closest to the mounting surface is preferably solid.

It is when the dimensions of the perforation openings are in the range of 20 μm to 310 μm, that a sufficient sound permeability of the metal foil layer may be achieved without appreciable loss of strength. The openings in this case are still small enough that numerous liquids, due to their inherent surface tension during the pressure differences which normally occur during operation of the vehicle, are unable to penetrate the openings. A circular opening cross section of the perforation openings is assumed in this case, wherein elongated opening shapes should also not be ruled out. In the case of a circular perforation opening, the above-cited preferred dimension relates to its diameter. In the case of an elongated perforation opening, the above-cited dimension refers to the larger of the two hole dimensions. The same applies to elliptical hole shapes having variously long elliptical axes.

In terms of its perforation, the metal foil layer preferably includes a perforation opening density of not more than one opening per $mm^2$, in order to still be able to achieve a gain in strength by incorporation of the perforated metal foil. The hole area proportion of the perforated layer may be, for example, 1% to 3%. One possible configuration of a perforated metal foil may include an average of 25 holes per $cm^2$ each with a hole diameter of approximately 300 μm.

To enlarge the surface of a metal foil, it may also be provided that at least one metal foil layer, preferably a metal foil layer that forms an exposed surface of the reinforcement component, is designed with a surface texture, in particular, is calotted. A surface textured metal foil, in particular a calotted metal foil, is preferably also fully connected to the plastic layer adjacent to it, so that the plastic layer connected to the surface textured metal foil has the same surface texture on the side directed toward the metal foil. As a result, the reinforcement components are retained with low thickness and yet higher component strength.

It may, but need not be, that only the surface of the reinforcement component located at a distance from the metal sheet component and therefore exposed is formed by a metal foil layer. For visual reasons, but primarily for reasons of mechanical protection of the reinforcement component, the exposed surface of the reinforcement component may be formed by a dampening layer on the side of the reinforcement component located at a distance from the metal sheet component, wherein said layer comprises or is a fiber web. A non-woven material or a carpet may be preferably used for such purpose. The dampening outer lying fiber tangle layer may be thermoplastically bonded, wherein the binder proportion of the total mass of the layer is then smaller than in the other porous plastic layers of the reinforcement component. The fiber tangle layer situated as the outermost dampening layer is preferably unattached, however, with the exception of its surface, with which it is attached to the underlying layer of the reinforcement component The reinforcement component may have a weight per unit area of between 2,900 g/m$^2$ and 6,700 g/m$^2$, preferably between 3,500 g/m$^2$ and 6,200 g/m$^2$.

The reinforcement component may have a thickness of between 3.0 mm and 20 mm, depending on the degree of compaction and the layer structure. The modulus of elasticity of the plastic layers may be temperature dependent due to the use of thermoplastic plastics in the latter, wherein the modulus of elasticity normally decreases as the temperatures increase. This temperature dependency may be counteracted by using thicker metal foils. For example, one, two or more metal foils, each having a thickness of 200 μm or more, preferably even up to 300 μm, may be arranged in the reinforcement component. Foils having thicknesses of more than 300 μm can generally not be perforated or perforated only with great difficulty, with holes of the above-cited hole geometry, which is why thick metal foils are not preferred.

The reinforcement component preferably comprises only the components cited in the present application.

The use of the acoustically effective, inherently rigid reinforcement component on the metal sheet component has one additional very significant advantage: it allows the metal sheet of the metal sheet component, when the connection component is attached to it, to be designed significantly thinner compared to the mere arrangement of the metal sheet component without a reinforcement component. This results in a significant weight reduction, which more than compensates for the weight additionally introduced into the composite structure component by the porous reinforcement component.

Normal sheet thicknesses for sheet steel in vehicles are approximately 0.7 mm and approximately 1.1 mm for aluminum sheet. These sheet thicknesses may be at least halved by the arrangement of the reinforcement component designed as described above, so that the metal sheet is preferably a steel sheet having a sheet thickness of not more than 0.35 mm or is an aluminum sheet having a sheet thickness of not more than 0.55 mm. The reduced sheet thicknesses specified are maximum values. The sheet thicknesses may also be lower. The reduction in bending rigidity of the metal sheet accompanying the reduction in the sheet thickness is more than compensated for by the adhesive attachment to the surface of the reinforcement component and the inherent rigidity thereof. Ultimately, the composite structure component is lighter than a metal sheet component previously used at the same location in the motor vehicle and exhibits a higher bending rigidity. This is illustrated by the following simplified calculation. The steel sheet thickness decreases by 0.35 mm compared to a conventional steel sheet. In the case of a reinforcement component having a component thickness at the lower end of the above specified thickness range, the thickness of the composite structure component is again increased by 3.8 mm. Consequently, the composite structure component is thicker by approximately 3.5 mm or a factor of 5 than the metal sheet component previously used instead of the composite structure component according to the invention. Since the component thickness is incorporated in the bending rigidity by the third power, given a bending about a bending axis orthogonal to the thickness direction, the bending rigidity of the composite structure component, given the same modulus of elasticity of steel sheet and the material of the reinforcement component, would be higher by a factor of 25 than that of the metal sheet component originally used. Since the modulus of elasticity is incorporated only linearly in the bending rigidity and is only not lower by the factor 125 than that of steel, particularly in the case of highly compacted, thermoplastically bonded glass fiber composite materials having the exemplary thickness of 3.8 mm, a significant excess rigidity at a lower weight per unit area remains, even with a low modulus of elasticity of the material of the reinforcement component.

For thicker reinforcement components and for thinner metal sheet components, this effect even increases, since the modulus of elasticity of thermoplastically bonded fiber materials at best decreases under-proportionately with decreasing degree of compaction and thus, increasing thickness.

Even if the thickness of the metal sheet component may be significantly reduced as a result of the connection to the reinforcement component, the pure metal structure of the motor vehicle, i.e., before the metal sheet component is connected to the reinforcement component, may undergo the usual cathodic electrocoating as protection against corrosion. The advantages of the composite structure component described herein may therefore be utilized on motor vehicles without having to change processes essential in the manufacture of motor vehicles for this purpose. Thus, the metal sheet may also have a cathodic electrocoating. This is then preferably located between the metal of the metal sheet and the reinforcement component. Thus, the reinforcement component is connected to the metal sheet component after the latter has undergone cathodic electrocoating. In this case, it is not necessary for the reinforcement component to be directly connected to the cathodic electrocoated layer or to abut the latter. Additional intermediate layers may be situated between the cathodic electrocoated layer and the reinforcement component, for example, a powder coating or a varnish.

It is noted merely for the sake of completeness that the metal sheet component may also fully or partly include the above-cited coats on the side of its metal sheet directed away from the reinforcement component.

It may be further contemplated that the metal sheet component is planar or curved with large curvature radii, for example, of more than 200 mm, only in areas, whereas it includes rigidity-enhancing structures between these planar or broader curved sections, such as corrugations, arches or sills. Thus, it may be provided that the reinforcement component is formed from a plurality of separately designed reinforcement component parts, which are arranged spaced apart from one another on the metal sheet and connected adhesively to the latter. Thus, functional components of the motor vehicle or formations or components enhancing the rigidity of the metal sheet component are located in the cited spaces between the reinforcements component parts.

When it is stated above that surface of the composite component is connected to the metal sheet component, this is intended to mean that at least 30%, preferably more than 50% of the surface of the reinforcement component directed toward the metal sheet component and abutting the metal sheet component is adhesively connected to the metal sheet component with an adhesive situated therebetween. The adhesive may be applied in a pattern between the metal sheet component and the reinforcement component, for example, in a dot pattern or grid pattern.

However, for reasons of simple process control in the manufacture of the composite structure component, it is preferred that the composite component is fully connected to the metal sheet component, i.e., that everywhere the reinforcement component abuts the metal sheet component gap-free, adhesive is also situated between the cited components.

All of the above-cited metal components may be coated with the bonding agent to improve the bonding connection with the adhesive and/or may be surface treated in a manner known per se.

A possible adhesive is, for example, a polyurethane-based structural adhesive, wherein this adhesive should be cited as only exemplary.

The connection between the reinforcement component and the metal sheet component may, in addition to the adhesive surface connection, be secured by mechanical connection components, such as rivets, screws and the like.

The metal sheet component comprises a reshaped metal sheet in the sense it is used as a term in the present application, wherein the metal sheet has its final contour or its final shape which it requires in the installed state. Thus, the composite structure component introduced here is more than a mere semi-finished product. The motor vehicle composite structure components discussed herein may be used, for example, as motor vehicle hoods such as, for example, engine hoods, motor vehicle underbodies, motor vehicle roof surfaces, partitions between engine compartment and passenger compartment, partitions between passenger compartment and luggage compartment and the like.

The metal sheet component of the composite structure component according to the invention preferably has no sheet doubling for reinforcing flat sheet sections. The composite structure component exhibits sufficient component rigidity based on the combination of metal sheet component and reinforcement component, so that no doubling of material is required.

To further reinforce the surface of the motor vehicle structural component of the present invention, the surface of the reinforcement component may also be adhesively connected on the side of the metal sheet component which, in the fully installed state, is intended to face away from a motor vehicle functional space. This applies primarily to motor vehicle composite structure components, whose sides directed away from a motor vehicle functional space can be seen only with difficulty by an observer standing outside the vehicle. Such a component is, for example, a motor vehicle underbody or a part of the latter. Alternatively, the surface of the reinforcement component may be adhesively connected on the motor vehicle composite structure component of the aforementioned kind only with a side which, in the fully installed state, is intended to face away from a motor vehicle functional space. In this way as well, a significant rigidity advantage is achieved with the same weight or a significant weight advantage is achieved with the same rigidity.

For the reinforcement component connected with a side which, in the fully installed state, is intended to face away from a motor vehicle functional space, the aforesaid with respect to the reinforcement component applies mutatis mutandis as well.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
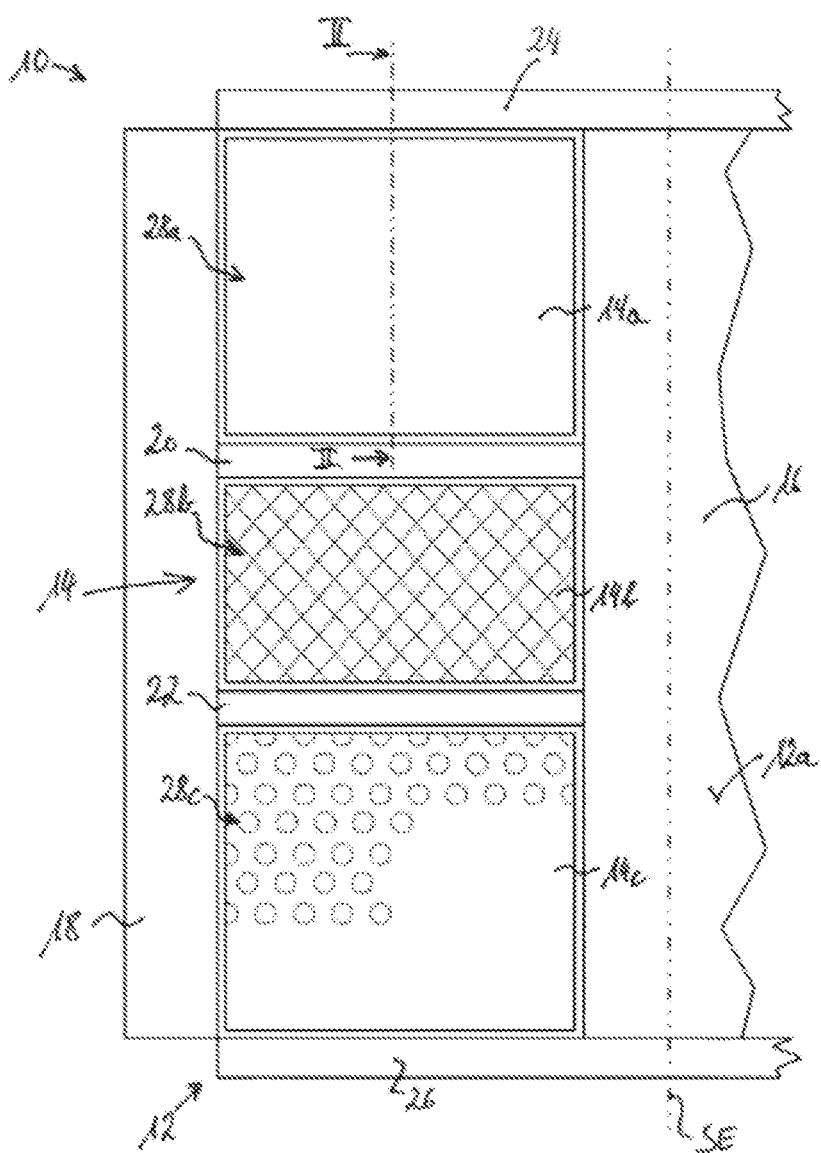
FIG. 1 shows a roughly schematic top view of a half of a motor vehicle underbody; and, FIG. 2 shows a roughly schematic longitudinal sectional view through a part of the underbody of FIG. 1 along the section plane II-II in FIG. 1.

Referring now to the drawings wherein the showings are for the purpose of illustrating preferred and alternative embodiments of the invention only and not for the purpose of limiting the same, FIG. 1 shows a motor vehicle composite structure component depicted roughly schematically in a top view in the form of a vehicle underbody that is referred to in general by reference numeral 10. The observer of FIG. 1 in this case looks out from the passenger compartment side of a vehicle using the composite structure component 10 onto the vehicle underbody 10.

The vehicle underbody 10 as the motor vehicle composite structure component of the present invention includes a metal sheet component 12 and a reinforcement component 14 connected to the metal sheet component 12 on the inside 12a thereof which is directed toward the passenger compartment.

The reinforcement component 14 in the present exemplary embodiment is designed with three, actually six reinforcement component parts 14a, 14b, 14c, which are designed separately from one another and each of which is connected separately to the metal sheet component 12.

The motor vehicle composite structure component 10 shown in FIG. 1 is symmetrically identical to a mirror plane of symmetry SE orthogonal to the drawing plane of FIG. 1. For this reason, only a half of the motor vehicle composite structure component 10 is depicted. However, the half thereof not depicted appears identical to the depicted half under the cited mirror symmetry condition.

Figure 2:
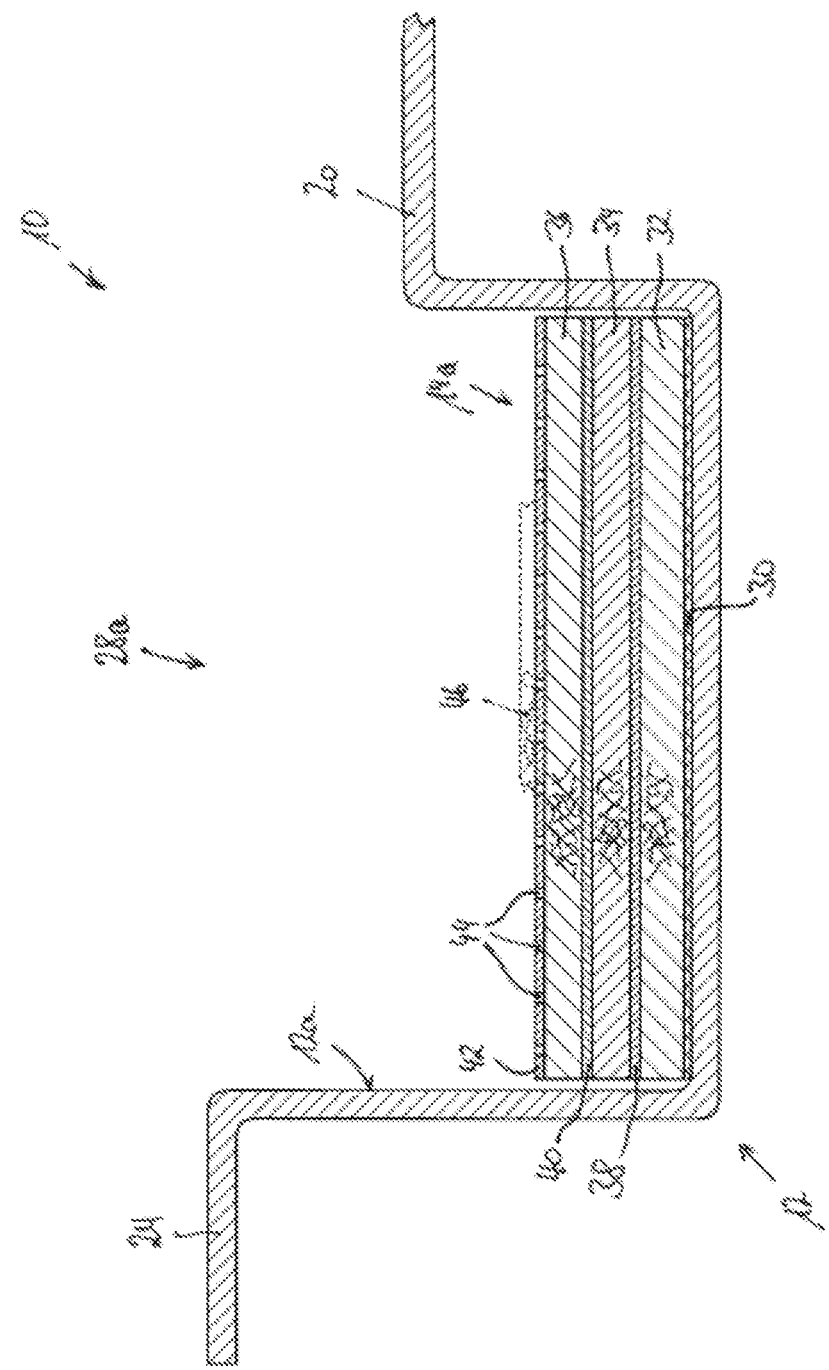

The metal sheet component 12 in the exemplary embodiment of FIGS. 1 and 2 has the following formations: a center tunnel 16 extending along the mirror plane of symmetry SE, side sills 18 running parallel to the center tunnel 16, seat cross-members 20 and 22 for mounting vehicle seats, which run essentially parallel to one another and orthogonally to the direction of extension of sills 18 and center tunnel 16, as well as a front wall 24 on the front longitudinal end of the metal sheet component 12 and a heel plate 26 situated at the rear end of the metal sheet component 12.

The front wall 24 may be used to arrange a partition between the vehicle underbody 10 and the engine compartment and to connect it to the vehicle underbody 10. Correspondingly, the heel plate 26 may be used to arrange a partition between the passenger compartment and a luggage compartment and to connect it to the vehicle underbody 10.

The metal sheet component 12 formed by deep drawing includes three essentially planar sections 28a, 28b and 28c between the cited functional formations 16 through 26 on each side of the plane of symmetry SE. One of the cited reinforcement component parts 14a through 14c each is arranged in each of these sections 28a through 28c.

The reinforcement component parts 14a through 14c are adhesively connected to the side 12a of the metal sheet component 12a directed toward the vehicle interior.

FIG. 2 shows a roughly schematic longitudinal section through the motor vehicle structural component 10 in the area of the first planar section 28a of the metal sheet component 12.

The view of FIG. 2 is merely roughly schematic and serves to illustrate the invention. Only those components are delineated in FIG. 2 that are located in the section plane II-II. Component segments located beyond section plane II-II, which would be apparent in technical drawings in a customary sectional representation, are not depicted in FIG. 2 for the sake of clarity. Thus, FIG. 2 does not show the center tunnel 16, for example, which is located beyond the section plane of FIG. 2.

In the area of the planar section 28a, the reinforcement component 14a is preferably fully connected to the metal sheet component by means of an adhesive layer 30. The adhesive layer is located between the mounting surface 13 on the inside 12a of the metal component 12 and a layer 30 of the reinforcement component 14a made of porous plastic.

The metal component 12 has undergone cathodic electro-coating preferably before being connected to the reinforcement component 14, so that it includes a cathodic electro-coated layer, which is not specifically depicted in FIG. 2. An additional coating of the metal component 12 may be provided between the cathodic electro-coated layer and the adhesive layer 30, for example, a powder coating or a varnish.

Instead of full-surface application of the adhesive, a partial surface application is also possible, wherein, for reasons of a preferably homogenous adhesive affect, the adhesive is applied preferably in a pattern. A grid-like adhesive application for the second reinforcement component part 14B and a dot-like adhesive application for the third reinforcement component part 14c, each in a regular pattern, are depicted for example by dashed lines in FIG. 1. The lines of the grid pattern display merely the course of the applied adhesive traces, but not their width.

At least 30% of the surface of a reinforcement component part abutting the metal sheet component 12 is preferably moistened with adhesive and connected to the metal component 12. Even more preferably, the portion of the cited surface moistened with adhesive is even larger.

A possible adhesive is, for example, the polyurethane adhesive previously cited in the introduction of the description.

The dimensions of the longitudinal sectional view of FIG. 2 are not to scale. The component thickness of the metal sheet component 12 is highly exaggerated compared to its other dimensions. In addition, the component thickness of the metal sheet component 12 is not proportional to the component thickness of the reinforcement component part 14a. Even the heights of the front wall 24 and the seat cross-members 20 above the planar area of the section 28a are not to scale compared to other dimensions apparent in FIG. 20, in particular, component thicknesses.

The reinforcement component part 14a in the exemplary embodiment depicted has three layers 32, 34 and 36—in their stack sequence away from the metal component 12, which are formed from thermoplastically bonded fiber material, in particular glass fiber material. The layers 32, 34 and 36 are partially compacted and therefore porous. A polyolefin, in particular polypropylene, is used as a binder.

The porous plastic layers 32, 34 and 36 thus form an LWRT material in the conventional sense. The layers 32, 34 and 36 may differ from fiber material, on the one hand, and from binder material, on the other hand, with respect to degree of compaction and mass proportions. In the case of differing degrees of compaction, it is preferable to design the layer 32 situated closest to the metal component 12 with greater compaction, since this layer in the present example is already covered by a solid metal foil layer 38 relative to the vehicle interior, and is therefore able to provide less to no sound-absorbing effect for absorbing sound originating from the vehicle interior, compared to the next closest porous plastic layer 36 to the vehicle interior.

The porous plastic layers 34 and 36 may also be separated from one another by a solid metal foil layer 40.

Finally, the reinforcement component part 14a may also have an additional metal foil layer 42, which may be located on the outside on the side directed away from the metal component 12 and may thus form an outer surface of the composite structure component 10.

This metal foil layer 42 located next to the vehicle interior is preferably perforated and has perforation openings 44, which fully permeate the metal foil layer 42. As a result, the metal foil layer 42 is sound-permeable in its thickness direction, so that the underlying porous plastic layer 36 may act as a sound absorber.

The perforation openings 44 are preferably circular and have a diameter of 150 μm to 300 μm, wherein, for reasons of strength, preferably not more than one hole is provided per square millimeter.

If necessary, the reinforcement component part 14a may be protected against mechanical properties on its exposed outer side with a non-woven material or carpet 46. This non-woven material or carpet layer 46 shown merely by dashed lines in FIG. 2 may be arranged on the metal layer 42.

The metal sheet of the metal sheet component 12 may, for example, have a thickness of 0.3 mm if it is a steel sheet or of 0.4 mm if it is an aluminum sheet, wherein the sheet thickness, reduced compared to the same underbody without reinforcement component 14, results in a significant weight reduction of the vehicle underbody. Although weight is added again with the reinforcement component 14, it is less than what was previously removed as a result of the sheet thickness reduction. A reduced rigidity need not be feared, since the inherently rigid reinforcement component 14, in the form of its inherently rigid partial components 14a through 14C in the present example, with its simultaneously sharply increased thickness, more than compensates for a reduced rigidity due to the high inherent rigidity of the introduced component. The reinforcement component 10 is more rigid, despite the significantly lower sheet thickness, than the previously used underbody component without a reinforcement component, but with a steel sheet having a thickness of 0.7 mm.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A flat motor vehicle composite structure component, comprising a metal sheet component having a shaped metal sheet and at least one flat, inherently rigid reinforcement component of porous plastic connected on at least one side of the metal sheet to the metal sheet component, the surface of the reinforcement component is adhesively connected to a side of the metal sheet component which, in the fully installed state, is intended to face an associated motor vehicle functional space,
   wherein the metal sheet component includes areas having different curvatures;
   wherein the metal sheet component includes at least two areas, each of which is at least one of planar and curved with a large curvature radii of more than 200 mm, wherein the metal sheet component includes at least one of corrugations, arches and sills between the at least two areas;
   wherein the reinforcement component comprises at least two reinforcement component parts;
   wherein the at least two reinforcement component parts are formed separately from one another;
   wherein in each one of the at least two areas of the metal sheet component at least one of the at least two reinforcement component parts is provided, and
   wherein the at least two reinforcement component parts are provided spaced apart from one another.

2. The motor vehicle composite structure component according to claim 1, wherein the reinforcement component includes porous plastic in the form of a thermoplastically bonded fiber material.

3. The motor vehicle composite structure component according to claim 2, wherein the thermoplastically bonded fiber material includes a thermoplastically bonded fiber web.

4. The motor vehicle composite structure component according to claim 1, wherein the reinforcement component includes at least one metal foil layer having a thickness of 0.03 mm to 1.3 mm which, under intermediate arrangement of a plastic layer of the reinforcement component extends essentially in parallel to the mounting surface of the metal sheet component, with which the reinforcement component is adhesively connected.

5. The motor vehicle composite structure component according to claim 4, wherein the reinforcement component includes a plurality of metal foil layers, each having a thickness of 0.03 mm to 1.3 mm, each of which, under intermediate arrangement of a plastic layer between two adjoining metal foil layers, extends essentially in parallel to the mounting surface of the metal sheet component.

6. The motor vehicle composite structure component according to claim 4, wherein at least one metal foil layer is perforated.

7. The motor vehicle composite structure component according to claim 6, wherein that at least one metal foil layer that is perforated is the metal foil layer located most distant from the mounting surface and having perforation openings with dimensions in the range of 20 μm to 310 μm.

8. The motor vehicle composite structure component according to claim 7, wherein perforation openings have dimensions in the range of 150 μm to 300 μm.

9. The motor vehicle composite structure component according to claim 4, wherein one of the at least one metal foil layers, includes a surface texture.

10. The motor vehicle composite structure component according to claim 9, wherein the one metal foil layer forms an exposed surface of the reinforcement component and the surface texture is calotted.

11. The motor vehicle composite structure component according to claim 1, wherein an exposed surface of the reinforcement component distant from the metal sheet component is formed by a fiber tangle layer.

12. The motor vehicle composite structure component according to claim 11, wherein the fiber tangle layer includes at least one of a non-woven material and a carpet.

13. The motor vehicle composite structure component according to claim 1, wherein the reinforcement component has a weight per unit area of between 2,900 g/m$^2$ and 6,700 g/m$^2$.

14. The motor vehicle composite structure component according to claim 1, wherein the reinforcement component has a thickness of between 3.0 mm and 20 mm.

15. The motor vehicle composite structure component according to claim 1, wherein the metal sheet is a steel sheet having a sheet thickness of not more than 0.35 mm or an aluminum sheet having a sheet thickness of not more than 0.55 mm.

16. The motor vehicle composite structure component according to claim 1, wherein the metal sheet component has a cathodic electro-coated layer, which is located between the metal of the metal sheet and the reinforcement component.

17. The motor vehicle composite structure component according to claim 1, wherein the metal sheet component has a coating which is located between the metal of the metal sheet and the reinforcement component.

18. The motor vehicle composite structure component according to claim 17, wherein the coating includes a powder coating or a varnish.

19. The motor vehicle composite structure component according to claim 1, wherein the reinforcement component is formed from a plurality of separately designed reinforcement component parts, which are arranged spaced apart from one another on the metal sheet component and adhesively connected to the metal sheet component.

20. The motor vehicle composite structure component according to claim 1, wherein an adhesive for adhesively connecting the reinforcement component to the metal sheet component is provided in a pattern or full surface between the reinforcement component and the metal sheet component.

21. The motor vehicle composite structure component according to claim 1, wherein the motor vehicle composite structure component is at least one of a motor vehicle hood, a motor vehicle underbody, a motor vehicle roof surface, an engine partition between an engine compartment and a passenger compartment; and a luggage partition between the passenger compartment and a luggage compartment.

* * * * *